United States Patent [19]

Aoki

[11] Patent Number: 4,773,842

[45] Date of Patent: Sep. 27, 1988

[54] INJECTION MOLDING MACHINE

[76] Inventor: Katashi Aoki, 6037 Ohazaminamijo, Sakaki-machi, Hanishina-gun, Nagano-ken, Japan

[21] Appl. No.: 124,353

[22] Filed: Nov. 23, 1987

Related U.S. Application Data

[63] Continuation of Ser. No. 711,388, Mar. 13, 1985, abandoned.

[30] Foreign Application Priority Data

Mar. 14, 1984 [JP] Japan .................................. 59-48826

[51] Int. Cl.$^4$ ....................... B29C 45/07; B29C 45/74
[52] U.S. Cl. ............................... 425/190; 264/328.11; 264/328.14; 366/76; 425/550; 425/574
[58] Field of Search ............... 425/152, 143, 144, 190, 425/379 R, 542, 550, 567, 569, 572, 574, 589, 186, 595, 188; 264/328.11, 328.14, 40.6; 366/76

[56] References Cited

U.S. PATENT DOCUMENTS 3,335,464  8/1967  Schwartz ............................. 425/567
3,425,095  2/1969  Kotek .................................. 425/144
3,924,994 12/1975  Aoki ................................... 425/574

OTHER PUBLICATIONS

Modern Plastics Encyclopedia, 1982–1983, p. 214.

Primary Examiner—Jay H. Woo
Assistant Examiner—Timothy W. Heitbrink
Attorney, Agent, or Firm—Ostrolenk, Faber, Gerb & Soffen

[57] ABSTRACT

The present invention provides a new injection molding machine in which a space left between a mold clamping device and an injection device provided on the machine base is utilized for installation of an electric box, and the electric box may be mounted on the machine base without particularly increasing the upper area of the machine base whereby reducing the installation area required for the molding machine.

6 Claims, 2 Drawing Sheets

INJECTION MOLDING MACHINE

This is a continuation of application Ser. No. 711,388 filed on Mar. 13, 1985, now abandoned.

BACKGROUND OF THE INVENTION

1. Field of the Invention

This invention relates to an injection molding machine used in the case where molten synthetic resin or plastic is poured into a mold to obtain a desired molded article.

2. Description of the Prior Art

In injection molding machines heretofore used, a mold clamping device and an injection device are placed on and secured to a machine base, and an electric box is mounted on the surface on the side of the machine bed.

The electric box houses a power board and a number of electric devices necessary for injection molding such as devices for controlling a heater used to heat an injection cylinder, hydraulic device, for driving an injection device and a mold clamping device. Meters for the above-described devices and regulating members are mounted on a door panel thereof.

Electric wires for heaters and magnet hydraulic values provided on the side of the injection device are loosely disposed, between said electric box and said injection device, so as not to be a hindrance to forward and backward movement of the injection device as it proceeds through a molding cycle. However, the wiring is often a hindrance to maintenance and inspection of the injection device and the necessity of excessively long wiring is costly. A further disadvantage is that to read meters, operate, and inspect the equipment, the operator must be bent forward.

Even if the depth of the electric box is small, when the electric box is mounted on the side surface of the machine base, the lateral width of the machine base increases on account of the electric box. This increase in lateral width results in an increase in installation area of the device, which is considered to be unfavorable for a user who always intends to effectively make use of the indoor of the factory which has a limitation in floor area.

SUMMARY OF THE INVENTION

This invention has been achieved in an attempt of solving these problems in connection with the electric box with respect to the above-described conventional injection molding machine.

In the past, mounting of the electric box in the injection molding machine merely made use of the side surface of the machine base and overlooked the above-described disadvantages resulting from the mounting of the electric box.

As a result of various attempts such as organization of electric wiring in the injection molding machine, improvements in readiness of operablility of electric devices and reading of meters, reduction of installation area, etc., the present inventor has found it best to situate the electric box on the machine base.

Generally, the upper surface of the machine base is of limited area, which can reasonably accommodate a mold clamping mechanism and an injection device but does not have sufficient room to accept the electric box. However, the present inventor has found that the electric box may be mounted on the machine base without increasing the upper area of the machine base.

It is therefore an object of the present invention to provide a new injection molding machine in which a space left between a mold clamping device and an injection device provided on the machine base is utilized for installation of an electric box, and the electric box may be mounted on the machine base without increasing an upper area of the machine base whereby an installation area for the devices may be reduced.

It is a further object of the present invention to provide a new injection molding machine in which an electric box is slidably mounted on the machine base together with an injection device to thereby shorten a wiring between the electric box and a heater, a solenoid valve or the like provided on the side of the injection device, thus achieving simplification of wiring work and saving of wiring cost.

It is another object of the present invention to provide a new injection molding machine having an improved layout in which operation of hand-operated devices and confirmation of meters may be easily carried out by an electric box and a hydraulic piping block installed on the machine base, and maintenance inspection of devices may be very conveniently carried out.

This invention has its characteristic in that both injection device and electric box are placed on and secured to a seat plate movably provided on the machine base. The aforesaid seat plate is held by a plurality of guide members provided on both sides on the machine base, and the electric box is accommodated in a space beneath an injection and heating cylinder, and placed on and secured to the seat plate. A space between an injection cylinder and an upper surface of the machine base varies with a gate position of a mold clamping device installed on the machine base but a space over the machine base formed on both sides of the injection cylinder is enough to install the electric box and the injection and heating cylinder will not be an obstacle to such installation.

Mounting of the injection device on the seat plate can be carried out directly or through the hydraulic piping block, but it will be preferable to carry out such mounting through the hydraulic piping block in view of rational wiring over the injection device side and electric box side.

Since the electric box is moved forward and backward along the injection device with respect to the mold clamping device by the seat plate, it is not necessary to provide an excessively long wiring in anticipation of the amount of movement as in the case where the electric box is secured to the side of the machine base.

Details of the present invention will be further described by way of embodiments shown in the accompanying drawings.

BRIEF DESCRIPTION OF THE DRAWINGS

The drawings show one embodiment of the injection molding machine in accordance with the present invention.

DESCRIPTION OF THE PREFERRED EMBODIMENTS

Figure 1:
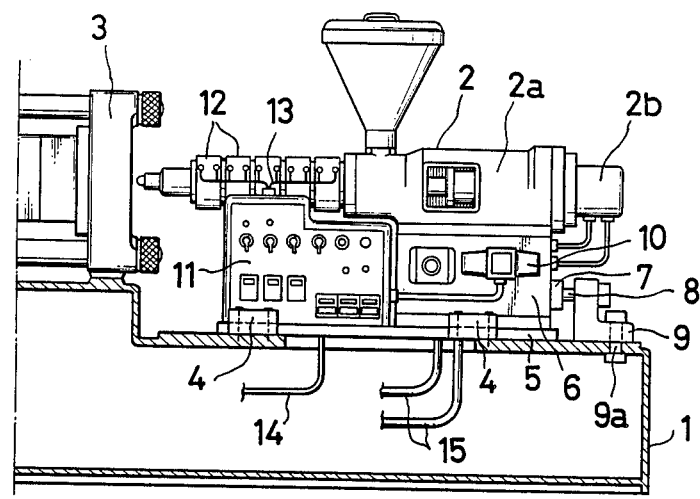
FIG. 1 is a side view of an essential portion partly cutaway of the machine base.
Figure 2:
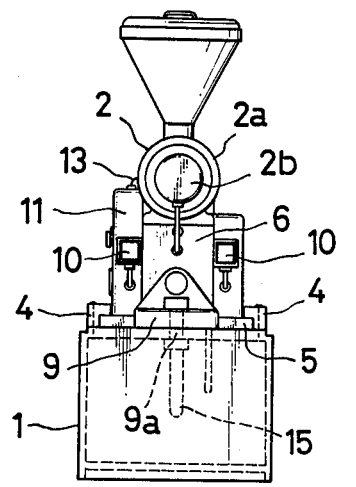
FIG. 2 is a rear view of the injection device.

A machine base 1 is constructed in a conventional manner, and an injection device 2 and a mold clamping device 3 are laterally installed on the machine base 1.

On the upper surface of the machine base on which the injection device 2 is installed in a rectangular seat plate 5 which is held movably in a direction of the mold clamping device 3 by means of a plurality of guide members 4, 4 in spaced apart relation.

A rectangular parallelopiped hydraulic piping block 6 also serving as a bed seat of the injection device 2 is mounted on the seat plate 5 while being displaced rearward, and above the hydraulic piping block 6, the injection cylinder 2 is installed on the machine base, having a rear cylinder portion 2a connected thereto.

Interiorly of the hydraulic piping block 6 are provided a hydraulic passage (not shown) connected to the cylinder portion 2a and to a hydraulic motor 2b at the rear of the cylinder, and a nozzle touching hydraulic cylinder 7. On the external surface are mounted solenoid-operated valve devices 10, 10 which switch the internal hydraulic passage or control the quantity of oil and pressure.

Forward and backward movement of the injection device 2 are effected by actuation of the hydraulic cylinder 7 having a rear end of a piston 8 connected to a member 9 rotatably mounted by a shaft 9a top the rear end on the upper surface of the machine base 1.

An electric box 11 is installed on the forward portion of the seat plate 5, that is, on the seat plate on the underside of an injection and heating cylinder. Inside the electric box 11 are housed switches, various electric devices and meters required to operate the injection device 2 and the mold clamping device 3, and display portions, operating elements and the like therefor are provided on the surface of a panel. Electric wires 13 run from the electric box 11 to the electromagnetic valve devices 10 and a heater 12 in the peripery of the injection and heating cylinder. Since both the injection device 2 and the electric box 11 are installed on the seat plate and are movable with respect to the machine base 1, the wires 13 need not be much longer than where the electric box 11 is secured to the side of the machine base.

Also, the wiring 14 to the electric box 11 may be accomplished within the machine base 1 in a manner similar to piping 15 to the hydraulic piping block 6, leaving the periphery of the injection device 2 free of obstructing cables and hoses.

Since the electric box 11 moves along with the injection device 2, even if the electric box 11 is in front of the injection device 2, it will not obstruct the injection device 2 during insertion. In addition, even though the electric box 11 is positioned on the underside of the injection and heating cylinder, the electric box 11 will not be thermally affected by a heater 12 since the latter is covered by a heat insulating cover, and the electric devices within the electric box 11 will not be degraded.

Figure 4:
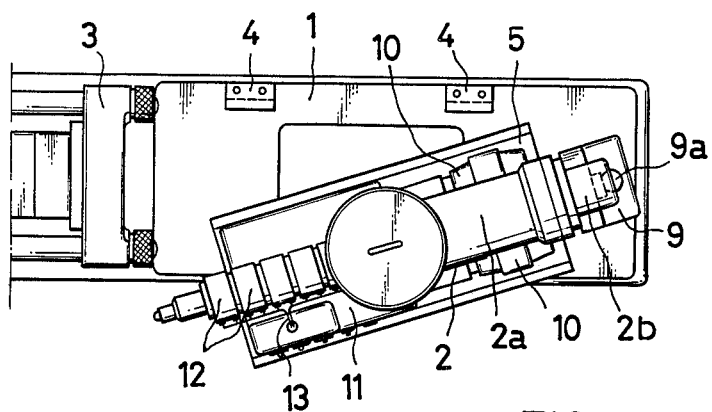
FIG. 4 is a plan view showing the injection device turned sideways.
Figure 3:
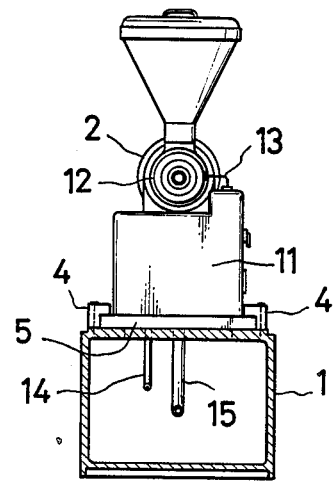
FIG. 3 is a front sectional view of the side of the injection device as viewed from front traversing the machine base.

Furthermore, in cleaning the interior of the injection and heating cylinder and in replacing the screw, the guide members 4 on one side of the machine base may be removed to permit one to rotate the seat plate 5 about the shaft 9a on the machine base as shown in FIG. 4, whereby the end of the injection device 2 along with the electric box 11 may be displaced outside the machine base, and therefore, the electric box 11 will not be an obstruction when the screw is replaced.

As will be apparent from the above-described embodiment, in accordance with the present invention, the electric box, which is normally mounted on the side of the machine base, is installed on the slide plate, and therefore, reducing the overall size required for the base.

Moreover, a further advantage of the present invention is that the meters are easily visible and the operator can easily reach the controls.

What is claimed is:

1. A lateral-type injection molding machine having a base including a generally horizontal upper surface, an injection device having an injection and heating cylinder, and a mold clamping device, the machine further comprising:

a movable seat plate having at least two generally parallel sides slideably received on the upper surface of said base, the injection device being secured to the seat plate for being moved with the seat plate toward and away from the mold clamping device;

a plurality of removable guide members secured to the upper surface of the base on either side of the seat plate to guide and constrain the movement of the seat plate in the direction toward and away from the mold clamping device;

an electric box for controlling the injection device, being secured to the seat plate and being positioned beneath the injection and heating cylinder of the injection device; and a hydraulic piping block on the seat plate having plurality of hydraulic passages, a hydraulic cylinder, and an anchoring block member being mounted on the base, the hydraulic cylinder having a piston rod connected to the anchoring block member for moving the injection device and therewith the electric box toward and away from the mold clamping device;

wherein the anchoring block member is rotatably received on a shaft mounted on the base, to allow radial movement of the seat plate about the shaft, when the guide members are removed from at least one side of the seat plate.

2. A lateral-type injection molding machine having a base including a generally horizontal upper surface, an injection device having an injection and heating cylinder, and a mold clamping device, the machine further comprising:

a movable seat plate having at least two generally parallel sides slideably received on the upper surface of said base, the injection device being secured to the seat plate for being moved with the seat plate in an axial direction toward and away from the mold clamping device;

removable guide means secured to the upper surface of the base on either side of the seat plate for guiding and constraining the movement of the seat plate in said axial direction toward and away from the mold clamping device; and means for electrically controlling the injection device, said means being secured to the seat plate and being positioned beneath the injection and heating cylinder of the injection device;

anchor means defined on the base;

hydraulic means on the anchor means for applying force to the injection device and thereby moving the seat plate, injection device and electric control means with respect to the base;

wherein the anchor means comprises pivot means for pivotally mounting the anchor means on the base, for permitting pivotal movement of the seat plate in a direction other than said axial direction, when said guide means is removed from at least one side of the seat plate.

3. A machine as in claim 2, wherein said anchor means comprises an anchoring block member which is rotatably received on a shaft mounted on the base to allow radial movement of the seat plate about the shaft when the guide means is removed from at least one side of the seat plate.

4. A machine as in claim 2, wherein said electrical control means comprises a control box including a plurality of electrical controls.

5. A machine as in claim 2, wherein said hydraulic means comprises a hydraulic cylinder and associated hydraulic supply means mounted on the seat plate, the hydraulic cylinder having a piston rod which is connected to the anchor means.

6. A machine as in claim 3, wherein said hydraulic means comprises a hydraulic cylinder and associated hydraulic supply means mounted on the seat plate, the hydraulic cylinder having a piston rod which is connected to the anchoring block.

* * * * *